United States Patent [19]

Kauffman et al.

[11] 4,036,573

[45] July 19, 1977

[54] STRETCH BLOW MOLDING APPARATUS

[75] Inventors: Ivan L. Kauffman, Commerce Township, Oakland County; Robert C. Kellogg, Hartland Township, Livingston County, both of Mich.

[73] Assignee: Monsanto Company, St. Louis, Mo.

[21] Appl. No.: 699,145

[22] Filed: June 23, 1976

Related U.S. Application Data

[63] Continuation of Ser. No. 415,850, Nov. 14, 1973, abandoned.

[51] Int. Cl.² .............................................. B29C 17/07
[52] U.S. Cl. .................................... 425/529; 425/437; 425/535; 425/536
[58] Field of Search ................. 425/DIG. 216, 387 B, 425/326 B, 242 B, DIG. 203, DIG. 204, DIG. 205, DIG. 209, DIG. 232, 437

[56] References Cited

U.S. PATENT DOCUMENTS

| 3,496,597 | 2/1970 | Ayres | 425/437 |
| 3,776,991 | 12/1973 | Marcus | 425/DIG. 216 |
| 3,924,998 | 12/1975 | Moore | 425/DIG. 232 |

Primary Examiner—Richard B. Lazarus
Attorney, Agent, or Firm—Michael J. Murphy

[57] ABSTRACT

A stretch blow molding method for blow molding hollow articles from tubular parisons, and a molding apparatus for carrying out the method. The method includes mounting a tubular parison having a closed end and an open end on a stretch pin means with the closed end in the upper position, and then moving the stretch pin means into an open multi-section molding apparatus. The stretch pin means is then operated to stretch the parison to a predetermined length with the mold halves in an open position. The mold halves are closed after said stretching operation and blow air under pressure is introduced into the parison near the neck portion to blow the parison into molding contact with the closed multi-section mold apparatus. After the molds are opened the article is ejected by air exiting from the tip of the stretch pin near the base of the article.

2 Claims, 12 Drawing Figures

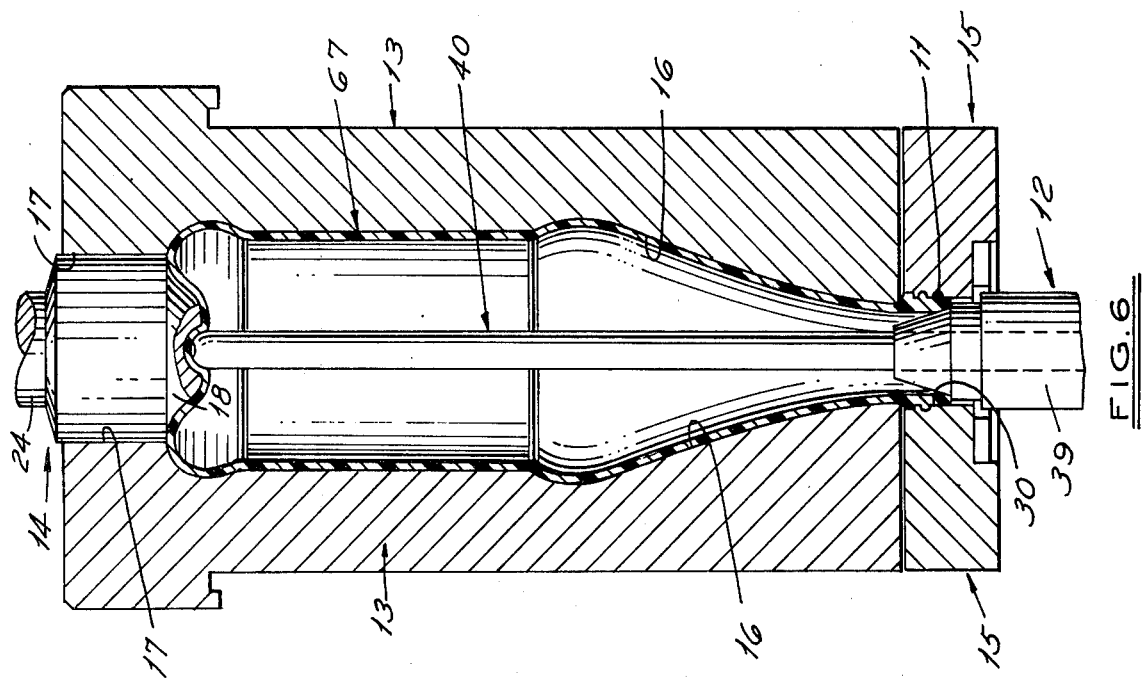
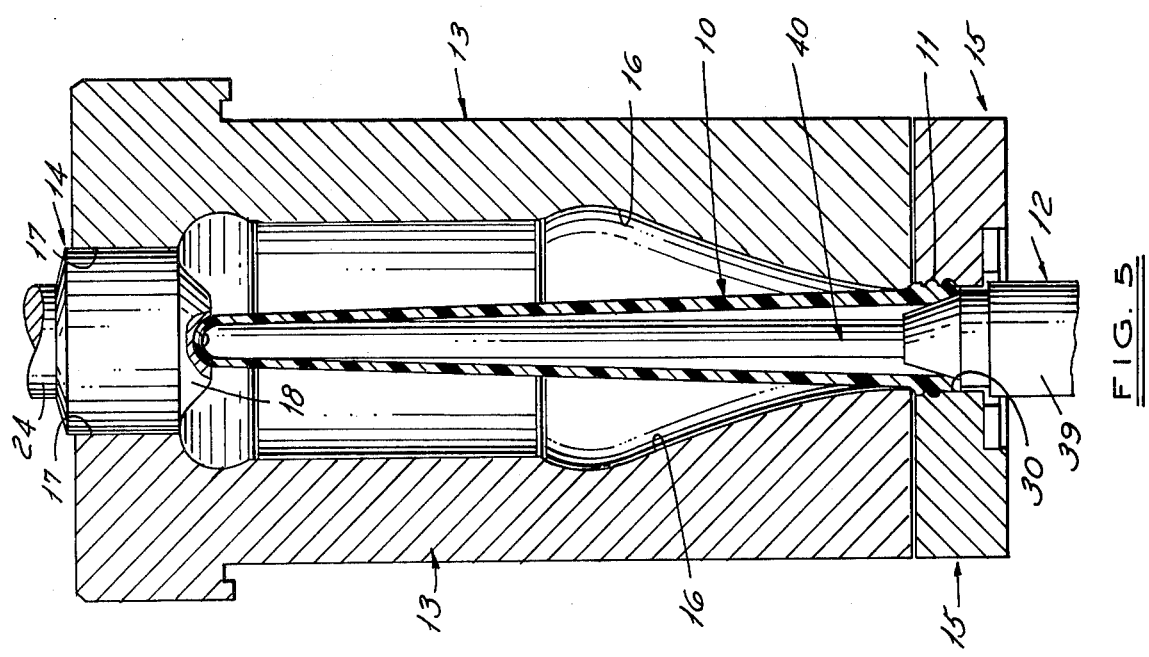

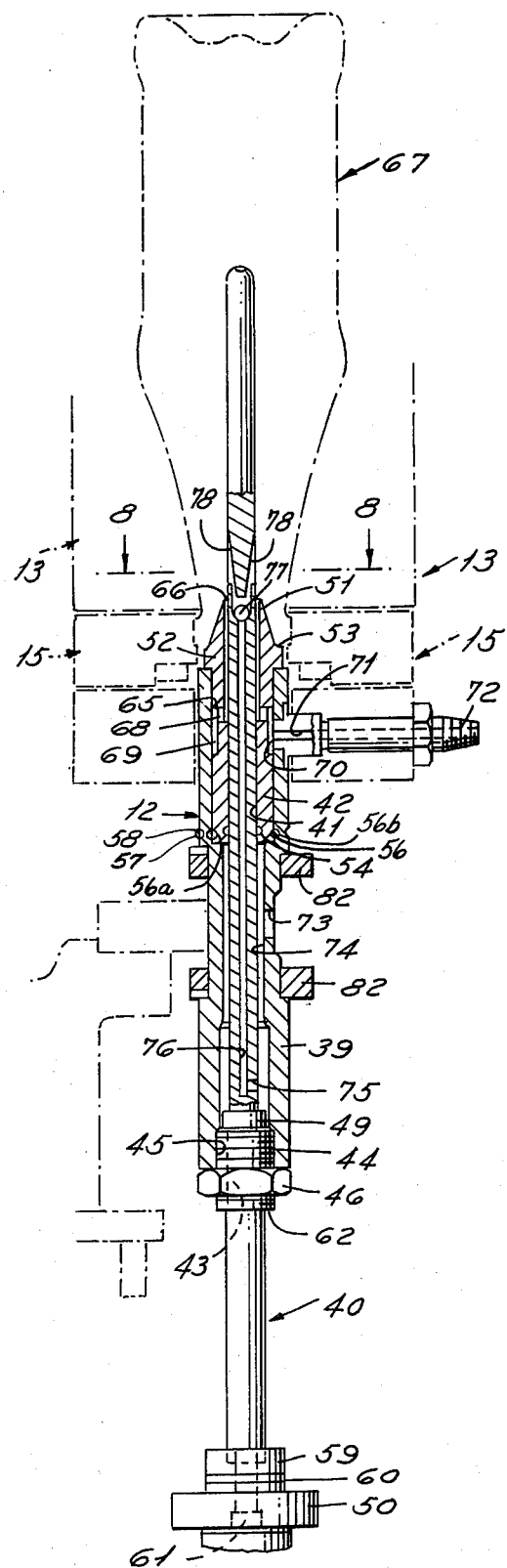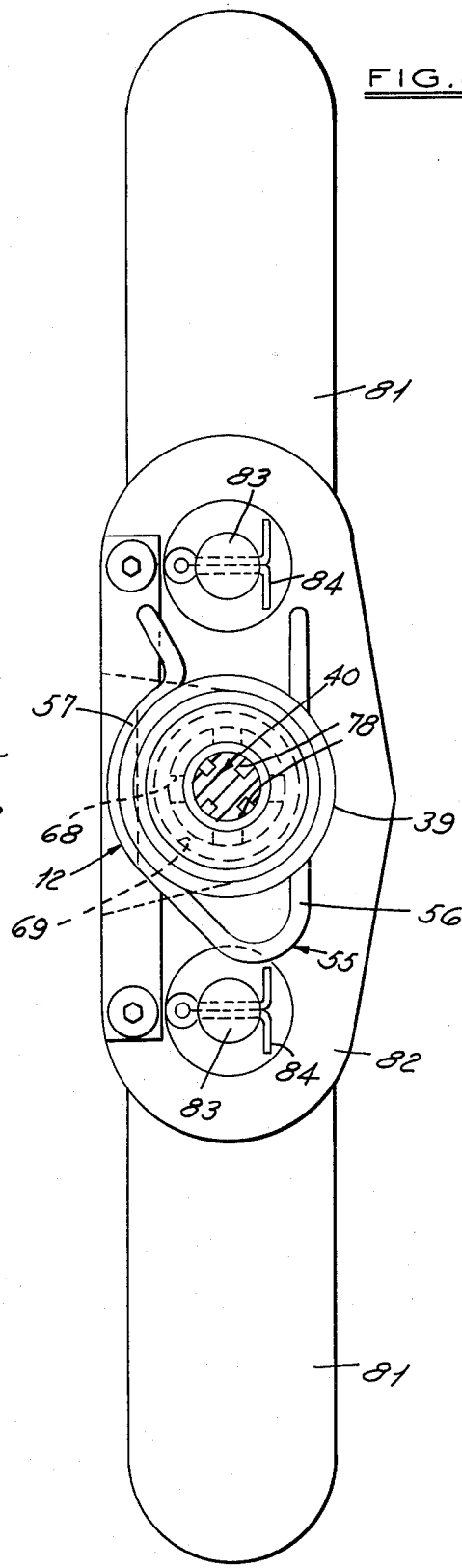

STRETCH BLOW MOLDING APPARATUS

This is a continuation, of application Ser. No. 415,850, filed Nov. 14, 1973, now abandoned.

SUMMARY OF THE INVENTION

This invention relates to the stretch blow molding art, and more particularly, to a stretch blow molding method for blow molding hollow articles from tubular parisons, and a molding apparatus for carrying out the method.

Heretofore, various types of molding apparatuses and methods have been employed for blow molding performed parisons to form hollow articles. A disadvantage of such prior art blow molding methods and blow molding apparatuses is that the heated preformed parison is subject to a substantial chilling contact by the mold structure before the stretching and blowing operations. Said substantial chilling contact occurs at the neck portion of the heated parison and this is the portion of a parison which is the hardest to heat and the quickest to cool. Furthermore, the prior art methods and molding apparatuses involve a closing of the general mold structure before the heated parison is stretched, and a disadvantage of such procedure is that the heated parison is then relatively close to the mold structure and the mold structure will absorb considerable energy through radiation from the heated parison. The aforementioned substantial chilling contact of the heated parison by the mold structure and the closeness of the closed mold structure to the heated parison before stretching of the heated parison causes a premature chilling and an uneven chilling of the heated parison, with a resultant non-uniform wall thickness in the final stretched and blown article.

Accordingly, in view of the foregoing, it is an important object of the present invention to provide a novel and improved stretch blow molding method for blow molding hollow articles from tubular parisons and a molding apparatus for carrying out the method which overcomes the aforementioned disadvantages of the prior art stretch blow molding methods and molding apparatuses.

It is another object of the present invention to provide a novel and improved stretch blow molding method for blow molding hollow articles from tubular parisons wherein the parison is oriented axially in a multi-section molding apparatus between a pair of open mold halves and is stretched to a predetermined length before the mold halves are closed so as to eliminate chilling contact of the parison with the mold halves before the blowing operation is carried out.

It is another object of the present invention to provide a novel and improved stretch blow molding apparatus, for blow molding hollow articles from tubular parisons, comprising a multi-section molding apparatus including a pair of mold halves, a mold end plug and a pair of neck rings.

It is still another object of the present invention to provide a novel and improved stretch blow molding method for making hollow plastic articles from a heated elongated tubular parison having an open end with a neck portion and a closed end, and said parison being in a plastic condition subject to a blow molding operation, comprising the steps of, mounting said parison on a stretch pin means with said closed end in the upper position, moving the stretch pin means into an open multi-section mold apparatus including a pair of mold halves, a mold end plug and a pair of neck rings, moving said pair of neck rings into clamping engagement with said neck portion on the closed end of said parison, operating said stretch pin means to stretch said parison to a predetermined length with the mold halves in an open position, closing the mold halves into a closed position with the mold end plug, and introducing blow air under pressure through said stretch pin means into said parison and blowing said parison into molding contact with the multi-section mold apparatus. The mold halves may be moved from a fully open position to a partially open position when the neck rings are moved into clamping engagement with the parison neck portion. The stretch pin means may be operated to stretch the parison to a predetermined length by stretching the parison until the closed end of the parison engages the mold end plug either when the mold plug is disposed in a molding position, or when the mold plug has been first moved inwardly of the mold halves and then continuing the stretching as the mold end plug is moved outwardly of the mold halves to the molding position. The closed end of the parison engages the mold end plug in said molding position without any pressure being exerted by the parison closed end during a parison blowing operation.

Other features and advantages of this invention will be apparent from the following detailed description, appended claims, and the accompanying drawings.

BIREF DESCRIPTION OF THE DRAWINGS

FIG. 5 is a view similar to FIG. 4, but with the mold halves moved to a close position prior to the admission of air for forming a bottle from the parison.

FIG. 6 is a view similar to FIG. 5, and showing the parison blown into the final bottle shape.

FIG. 7 is an elevational view, partly in section, of a stretch pin assembly which may be employed with the mold structure of the present invention.

FIG. 8 is a horizontal view, partly in section, of the stretch pin assembly illustrated in FIG. 7, taken along the line 8—8 thereof, and looking in the direction of the arrows.

DESCRIPTION OF THE PREFERRED EMBODIMENT

The blow molding method and molding apparatus of the present invention are adapted for the production of hollow thermoplastic articles, such as bottles and the like. The preforms or parisons employed may be made from any suitable thermoplastic resin, as for example, polymers and copolymers of polypropylene. The resin may be extruded or molded into the parisons or performs, and then conveyed by suitable means to the molding apparatus of the present invention.

Figure 2:
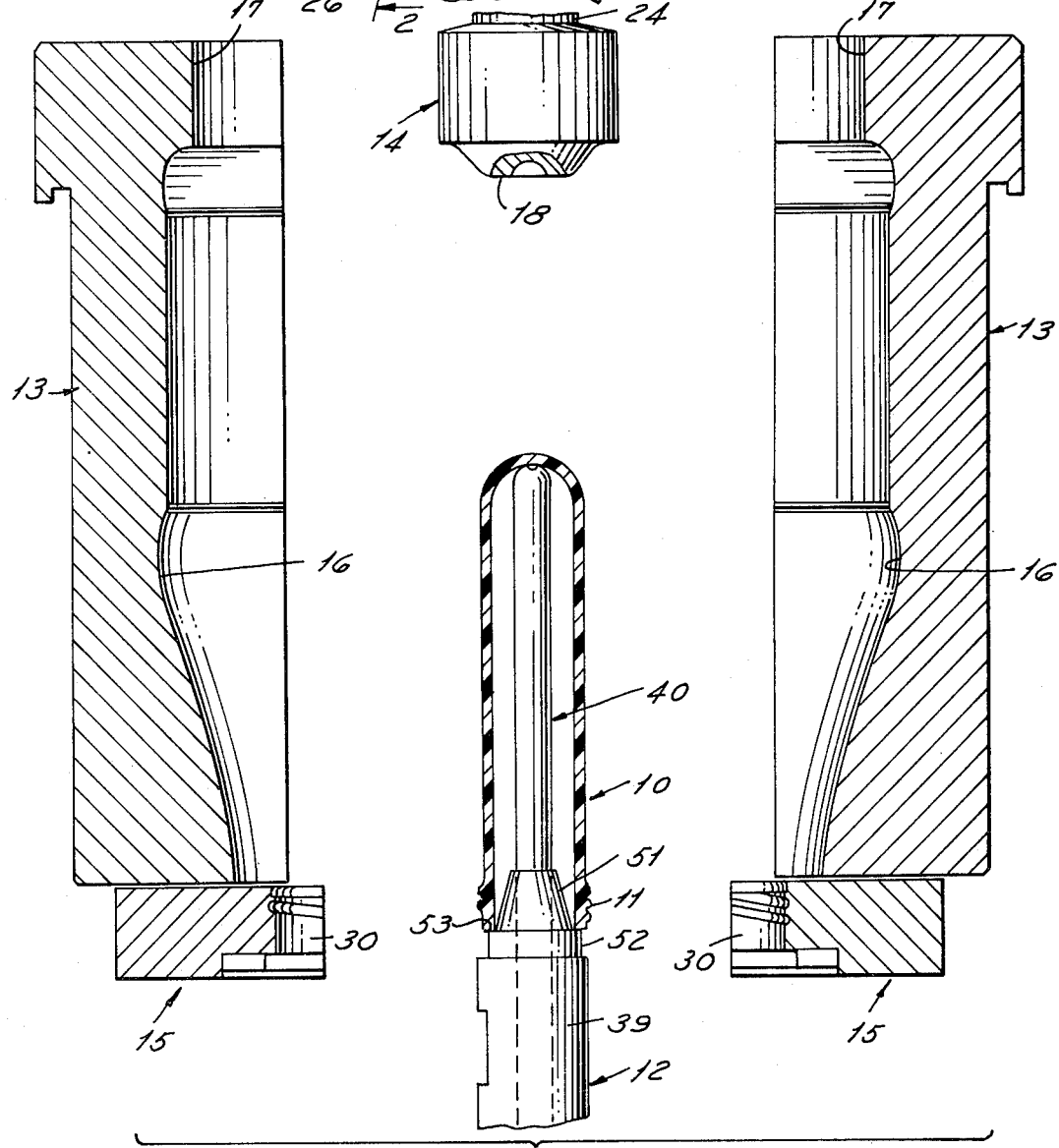
FIG. 2 is an enlarged, elevational section view of the mold structure illustrated in FIG. 1, taken along the line 2—2 thereof, looking in the direction of the arrows, and showing a stretch pin means having a parison mounted thereon and disposed in a position ready for a stretch blow molding operation.

The apparatuses for forming the parisons, and for heating and conveying the parisons to the molding apparatus of the present invention do not form any part of this invention, and any suitable such apparatuses may be employed. As shown in FIG. 2, the numeral 10 generally indicates a parison or preform which is sustantially test tube shaped. The elongated tubular parisons 10 have a closed end, and an open end around which is formed a thread indicated by the numeral 11. As shown in FIG. 2, the parisons 10 are loaded onto a suitable stretch pin means 12 for conveying the parisons 10 into the molding apparatus of the present invention for a stretch blow molding operation.

As shown in FIGS. 1 through 6, the molding apparatus of the present invention comprises a five-piece mold which includes a pair of side pieces or mold halves generally indicated by the numeral 13, a mold end plug generally indicated by the numeral 14, and a pair of neck rings or clamps generally indicated by the numeral 15. As shown in FIG. 2, each of the mold halves 13 has a cavity 16 formed therein for molding an article, which in this instance, comprises a bottle. The mold halves 13 are semicircular in cross section, and are each provided at the upper end thereof with a semi-circular central opening 17, which communicates with the cavity 16, and in which is operatively received the mold bottom end cap or end plug 14. The inner face 18 of the mold end plug 14 is shaped to form the bottom end of the bottle.

The mold halves 13, mold end plug 14 and neck ring clamps 15 may be cooled by any suitable means, as by being water cooled by providing suitable coolant passages through said mold parts and a suitable source of coolant under pressure for forcing coolant through said passages. A suitable coolant passage means is illustrated and described in the present inventors' co-pending U.S. patent application entitled "Rotary Stretch Blow Molding Apparatus", filed Nov. 14, 1973, Ser. No. 415,851, which is owned by the assignee of the present application. The disclosure of the last mentioned coolant passage means appears in FIGS. 2, 27, 28, 31, 35, 39 and 42 of said patent application, and the disclosure of said FIGS. and the written description relating thereto are incorporated herein by reference.

Figure 1:
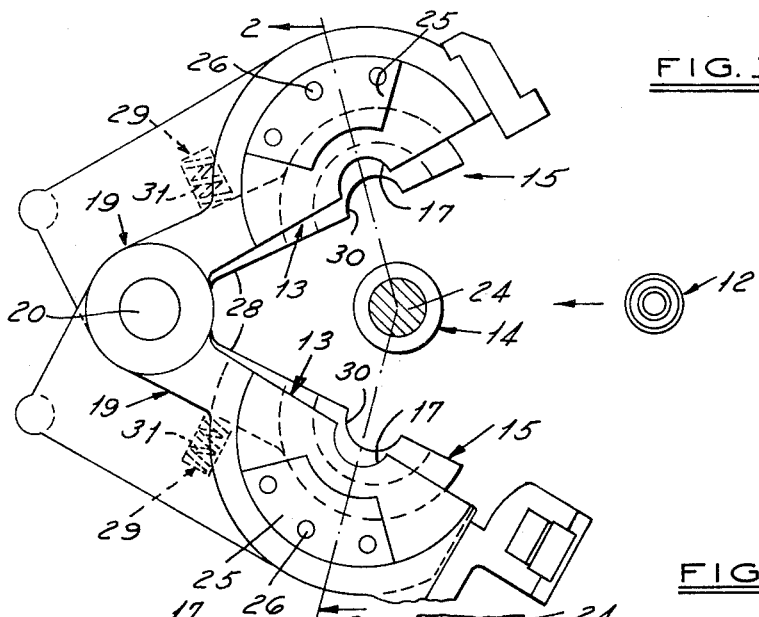
FIG. 1 is a top plan view of a five-piece stretch blow mold assembly made in accordance with the principles of the present invention.

The mold halves 13 and the mold neck rings 15 may be moved between the open position shown in FIGS. 1 and 2 and the closed position shown in FIGS. 5 and 6 by any suitable means, as by swingably mounting them on individual mold carriers indicated by the numeral 19 in FIG. 1. The mold carriers 19 are pivotally mounted on a mold carrier shaft 20 and may be moved between the open and closed positions by any suitable means. A suitable mold carrier means for swingably mounting and moving the mold halves 13 between the open and closed positions, is illustrated and described in the aforementioned U.S. application entitled "Rotary Stretch Blow Molding Apparatus" in FIGS. 4, 21, 22, 28–33, 36, 38 and 39 thereof, and the disclosure of said FIGS. and the written description relating thereto are incorporated herein by reference.

As shown in FIGS. 1 through 6, the mold bottom end plug 14 is operatively mounted on the lower end of a plug carrier shaft 24. A pair of arcuate mold end plug clamps 25 are adapted to be moved into a clamping position around the shaft 24 for positively positioning the mold end plug 14 at a specific molding position, shown in FIGS. 5 and 6, during a molding operation. The mold end plug clamps 25 comprise clamp plates which are secured to the upper end of the mold halves 13 by suitable machine screws 26. The mold end plug clamps 25 thus are moved into clamping engagement with the end plug 14 when the mold halves 13 are moved to the closed position.

It will be understood that when the stretch pin means 12 is moved into an operative position between the mold halves 13, that it is axially aligned with the mold end plug 14. As described in detail hereinafter, the parison 10 may be stretched until it engages the lower end 18 of the mold end plug 14 when the mold end plug 14 is either in the molding position shown in FIG. 5, or in a position moved axially inward of the mold halves 13 as shown in FIG. 3. Any suitable means may be provided for moving the mold end plug 14 between the inward position shown in FIG. 3 and the molding position shown in FIG. 5. As illustrated in FIG. 3, a suitable fluid operated power cylinder, generally indicated by the numeral 27, may be operatively connected to the mold end plug shaft 24 for moving the mold end plug 14 between the inward position of FIG. 3 and the molding position of FIG. 5.

Another suitable means for moving the mold end plug 14 between said inwardly moved position of FIG. 3 and the molding position of FIG. 5 is illustrated and described in the aforementioned U.S. patent application entitled "Rotary Stretch Blow Molding Apparatus", in FIGS. 2, 21, 22, 39, 41, 42, 53, 57 and 58 thereof, and the disclosure of said FIGS. 2, 21, 22, 39, 41, 42, 53, 57 and 58, and the written description relating thereto are incorporated herein by reference.

In the swingable mounting structure for the molding apparatus of the present invention, the neck rings 15 are carried on separate neck ring carriers 28 as shown in FIG. 1. The neck ring carriers 28 are each rotatably supported on the shaft 20. The neck ring carriers 28 are swung between the open position of FIG. 2 and the closed position of FIGS. 3 and 6 by any suitable means, as by being swung inwardly and outwardly between said positions with the movement of the mold halve carriers 19.

As shown in FIG. 1, the mold halve carriers 19 are interconnected with the neck ring carriers 28 by a suitable spring means 29 which functions to bias the neck ring carriers 28 inwardly relative to the inner edges of the mold halves 13 to permit the neck rings 15 to clamp a parison 10, as shown in FIG. 3, when the mold halves 13 are in a partially closed position.

As shown in a first embodiment in FIG. 2, each of the neck ring clamps 15 is provided with an arcuate recess 30 which has an inner surface shaped to mate with the neck threads 11 on a parison 10 when the neck rings 15 are moved to a clamping position, as shown in FIGS. 3 and 6. Each of the spring means 29 includes a pocket in the respective mold halve carrier 19 in which is seated a suitable spring 31 that has its outer end in abutting engagement with the adjacent neck ring carrier 28 so as to normally bias it forwardly of the adjacent mold halve 13.

The aforementioned neck ring carrier means and spring biasing means 28 and 29, respectively, are illustrated and described in detail in the aforementioned U.S. application entitled "Rotary Stretch Blow Molding Apparatus", in FIGS. 27, 28 and 35 thereof, and the disclosure of said FIGS. 27, 28 and 35, and the written description relating thereto are incorporated herein by reference.

Figure 3A:
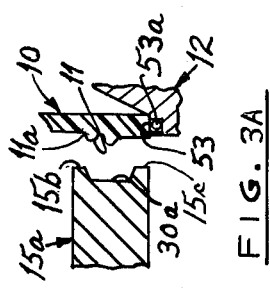
FIG. 3A is a fragmentary, elevational section view of a modified neck ring clamp and stretch pin means.
Figure 3:
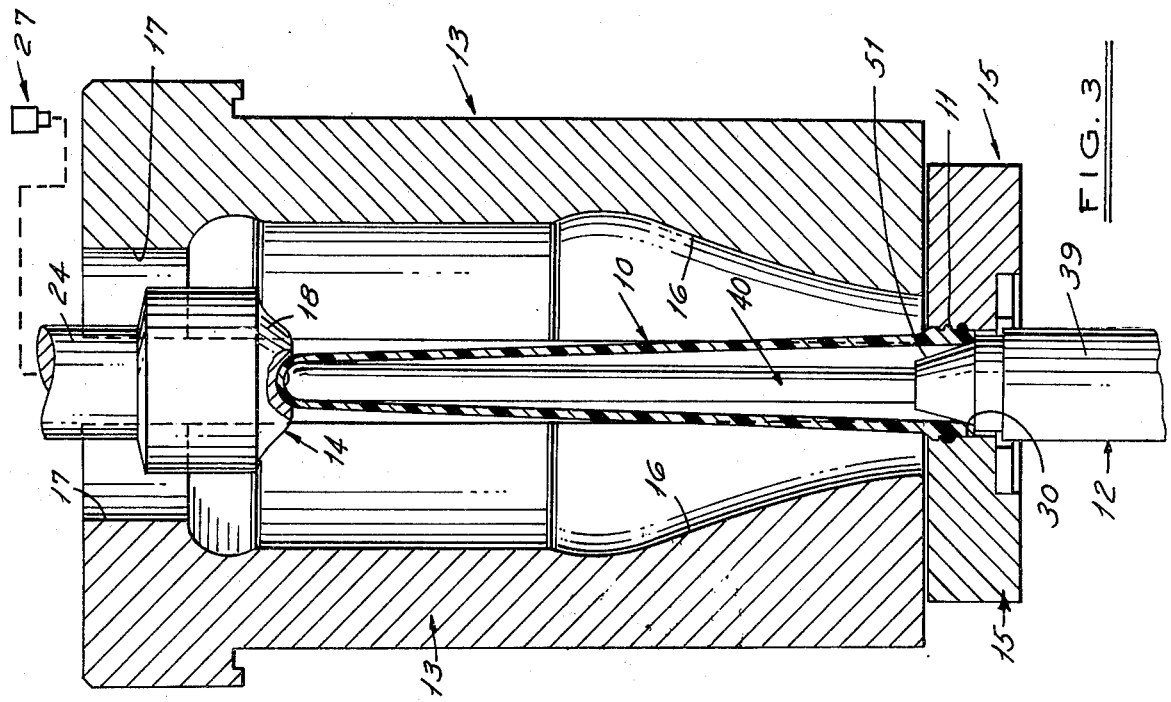
FIG. 3 is a view similar to FIG. 2, and showing the mold halves partially closed, the mold bottom plug moved inwardly between the mold halves a slight distance, and the parison clamped between the neck rings and stretched to meet the mold botton plug.

FIG. 3A shows a modified neck ring clamp 15a provided with an arcuate recess 30a that receives the parison neck threads 11. The modified recess 30a is bounded by an upper shoulder 15b that engages the shoulder 11a on the parison threads 11 to restrain the parison during the stretching operation and to provide a seal pressure on the parison during a stretching and blowing operation. The recess 30a is bounded by a lower shoulder 15c that engages the finial or threaded end of the parison 10 to provide a sealing pressure on the same and prevent expansion at said threaded end during blowing conditions. An O-ring 53a is operatively mounted in the flange surface 53 for sealing engagement with the threaded end 11 of the parison 10.

Figure 11:
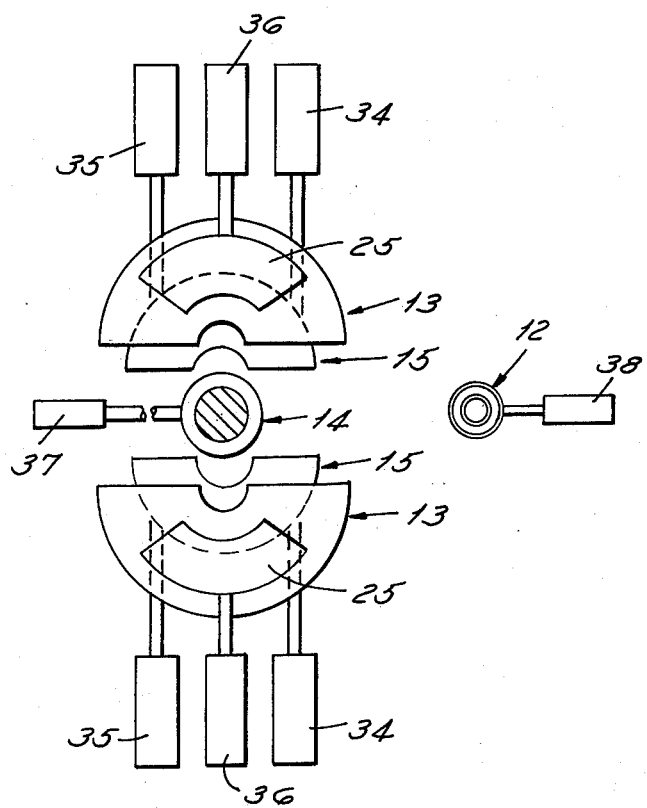
FIG. 11 is a top plan view of a five-piece stretch blow mold assembly made in accordance with the principles of the present invention and illustrating how the mold parts may be laterally moved apart to an open position instead of swingably moved apart as in the illustrations of FIGS. 1 through 10.

It will be understood that the mold halves 13, the mold end plug 14, and the neck ring clamps 15 may be moved between the open and closed positions by apparatuses other than a swinging structure means. FIG. 11 illustrates schematically how the aforementioned multi-section mold parts may be laterally moved between the open and closed positions by any suitable means, as by a plurality of suitable fluid operated power cylinders. In FIG. 11 the mold halves 13 are shown as being operable toward and away from each other by a pair of suitable fluid power cylinders 34. The neck ring clamps 15 are shown as being operated toward and away from each other between the open and closed operative positions by a pair of fluid operated power cylinders 35. The mold end plug clamps 25 are illustrated as being movable between the open and closed positions by a pair of suitable fluid operated power cylinders 36. The mold end plug 14 is illustrated as being movable in the aforedescribed manner by a suitable fluid operated power cylinder 37. The stretch pin means 12 is indicated as being operable so as to move a parison 10 into an operative position in the multi-section mold, and to withdraw the same, by a suitable power cylinder 38.

The stretch pin means 12 may be of any suitable construction. FIGS. 7 and 8 show one illustrative stretch pin means 12 which may be employed in carrying out the principles of the present invention. The stretch pin means 12 may be moved from the position shown in FIG. 1 into an operative position between the mold halves 13 by any suitable conveying structure. The stretch pin means 12 is moved into a position where it is axially aligned with the mold end plug 14.

As shown in FIG. 7, the stretch pin means 12 includes a stretch pin body 39 through which is longitudinally and slidably mounted a stretch pin 40. The upper end of the stretch pin 40 is slidably mounted in a longitudinal bore 41 of an air nozzle 42, which also functions as a bushing for the upper end of the stretch pin 40. The lower end of the stretch pin 40 is slidably supported in a bore 43 formed longitudinally through a suitable bushing 44 which is threadably mounted in a threaded hole 45 formed in the lower end of the tubular body 39. The bushing 44 is adjustably secured longitudinally in the body 39 by a suitable lock nut 46. A stop flange 49 is formed integrally on the stretch pin 40 to limit the downward movement by gravity of the stretch pin 40 in the stretch pin body 39.

The stretch pin 40 has a cam block 50 secured to its lower end, and it is adapted to be engaged by a suitable cam means to move the stretch pin 40 downwardly in the body 39 until the stop collar 49 engages the upper end of the bushing 44. It will be seen that the initial lowered position of the stretch pin 40 is thus determined by the position of the stop collar or flange 49 on the stretch pin 40, as well as the relative position of the bushing 44 in the stretch pin body 39.

It will be understood that the multi-section mold apparatus of the present invention may be used in units of one or more. The illustrations of FIGS. 7 and 8 show the use of the mold apparatus of the present invention on a molding machine employing a plurality of the molding apparatuses.

As shown in FIG. 7, the upper end of the air nozzle 42 extends upwardly beyond the upper end of the stretch pin body 39, and it is provided with a conical upper end surface 51 which functions as a bushing for guiding an inverted parison 10 downwardly over the upper end of the stretch pin 40 when a parison 10 is loaded on the stretch pin 40. The conical upper end surface 51 terminates at its lower end in a radial flange 52 which limits the downward movement of the air nozzle 42 in the stretch pin body 39. The upper surface 53 of the flange 52 also forms a shelf or seat for the threaded open end of a parison 10.

As shown in FIG. 7, a suitable seal means 54 is operatively mounted in the air nozzle 42 for slidable sealing engagement with the outer surface of the stretch pin 40. As shown in FIG. 8, a retainer hair pin lock generally indicated by the numeral 55, releasably secures the air nozzle 42 in position in the upper end of the stretch pin body 39. The hair pin lock 55 includes a straight leg portion 56 which is adapted to pass through a hole 57 (FIG. 7) formed by a pair of arcuate recesses which are horizontally aligned and formed on the outer surface of the air nozzle 42 and the inner surface of the stretch pin body 39, respectively. The retainer hair pin lock 55 also includes a curved leg portion 57 which is adapted to be seated in a peripheral arcuate recess 58 formed around the outer periphery of the stretch pin body 39.

As shown in FIG. 7, a cylindrical block 59 is secured together with the block 50 and intermediate shims 60 to the lower end of the stretch pin 40 by a suitable machine screw 61. The block 59 functions as a stop member for engagement with the lower end 62 of the bushing 44. The distance between the upper end of the stop block 59 and the lower end 62 of the bushing 44 governs the total upward travel of the stretch pin 40 into a parison 10 for a stretching operation. In one embodiment this travel amounted to 4".

Figure 10:
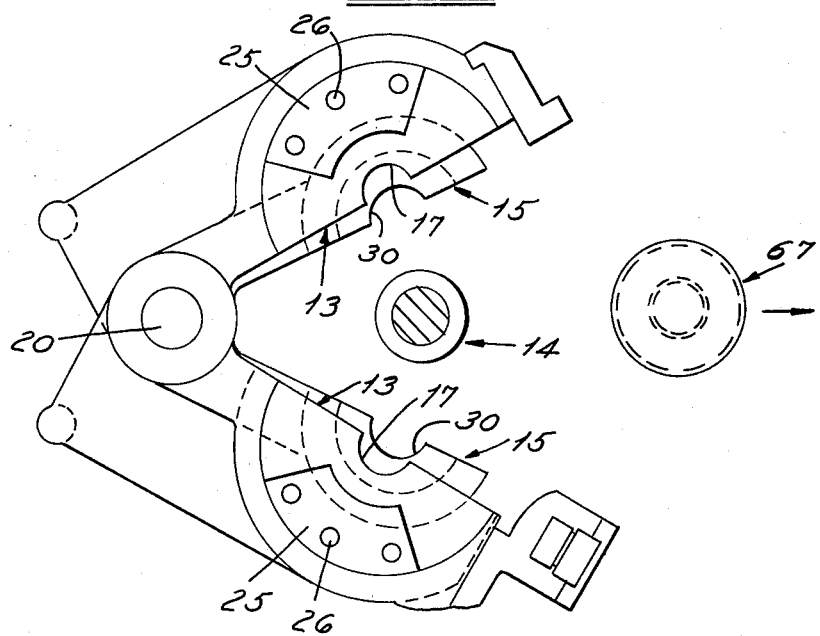
FIG. 10 is a view similar to FIG. 1, and showing a finished bottle being moved laterally out from between the opened halves of the mold structure of the present invention.

As shown in FIGS. 7 and 8, the upper end of the air nozzle 42 is enlarged to form an enlarged bore 65 so as to provide an annular passage 66 for the emission of blow air into the parison 10 for blowing the same into a finished article, as indicated by the bottle 67 in FIGS. 6 and 10. As shown in FIG. 7, the lower end of the annular passage 66 communicates with four cross-drilled holes 68 that communicate with a second outer annular passage 69. As shown in FIG. 7, the annular passage 69 communicates through an opening 70 in the side wall of the stretch pin body 39 with a passage 71 formed in a fitting 72. The fitting 72 is provided with a suitable sealing means around the passage 71 for engagement with the stretch pin body 39. The fitting 72 is adapted to be supplied with blow air from a suitable source of the same.

The stretch pin 40 is adapted to be supplied with transfer air for ejecting a finished bottle 67 from the stretch pin 40. As shown in FIG. 7, the stretch pin body 39 is provided with a transfer air inlet port 73 which communicates with an enlarged bore 74 in the stretch pin body 39 through which the stretch pin body 40 passes. Transfer air is admitted to the inlet port 73 and passes into the bore 74 and thence downwardly and through four cross-drilled holes 75 in the stretch pin 40 and into an axial passage 76. Transfer air flows upwardly through the axial passage 76 and past a ball check valve 77 and out through four upwardly sloping passages 78 and into the finished article 67 for ejecting the same from the stretch pin 40. It will be seen that the passages 78 have an inner sloping surface of approximately 9° relative to the centerline axis of the stretch pin 40. The ball check valve 77 restricts passage of the blow air outwardly through the axial passage 76 during an article blowing operation.

The stretch pin means 12 may be conveyed by an suitable means, and as shown in FIGS. 7 and 8, it may be operatively mounted on a carrier chain, having chain link plates 81 and 82 which are operatively connected by suitable hinge pins 83 and cotter pins 84.

Figure 4:
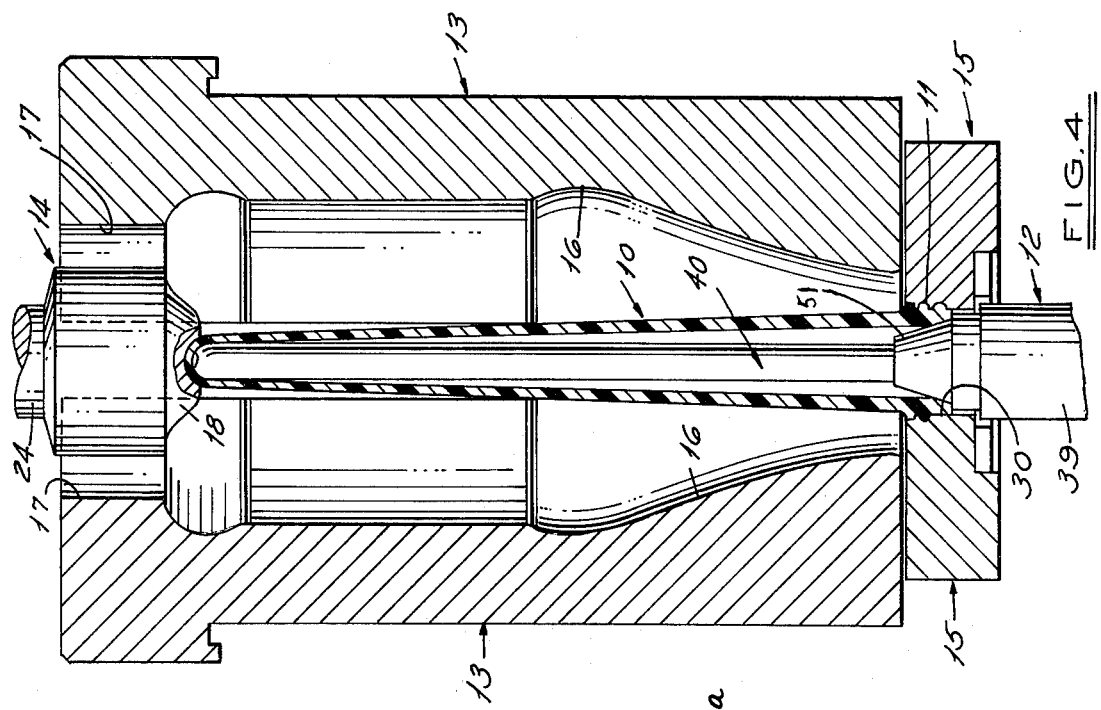
FIG. 4 is a similar to FIG. 3, and showing the mold bottom plug retracted to the normal bottle blowing position, and with the parison stretched to a position prior to being blown into a bottle.

FIGS. 4, 5 and 6 show a stretch pin 40 in the fully raised position for a blow molding operation. FIG. 7 shows a stretch pin 40 in the initial or lowered position for receiving a fresh parison 10 and for moving the same into the multi-section molding apparatus of the present invention. The stretch pin 40 may be actuated from the initial lowered position of FIG. 7 by any suitable means, and a suitable actuator means is shown in FIG. 9.

Figure 9:
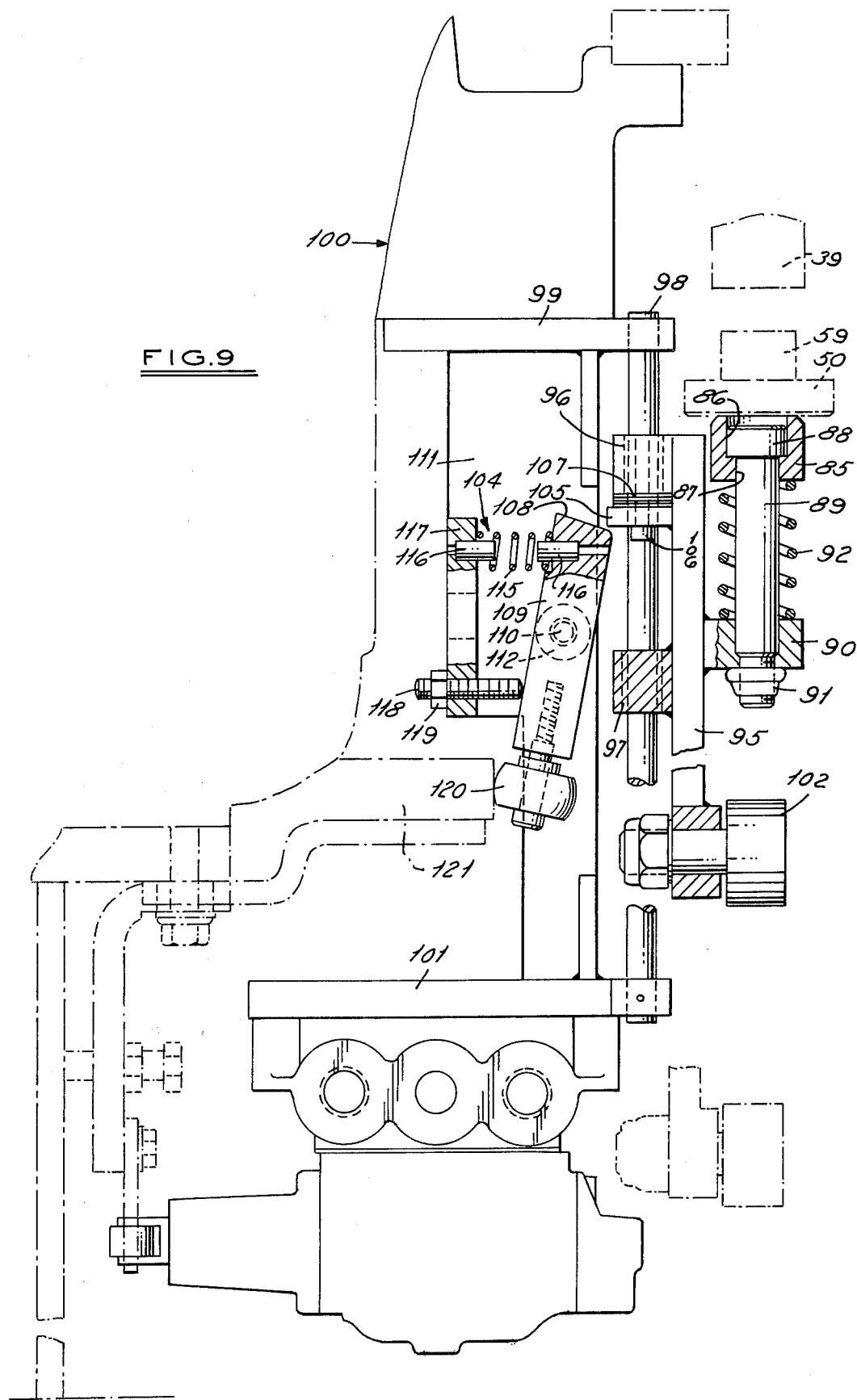
FIG. 9 is an elevational view, partly in section, of an actuator means that may be used for actuating the stretch pin assembly illustrated in FIGS. 7 and 8.

The stretch pin actuator means illustrated in FIG. 9 includes a spring pressure means adapted to engage the lower side of the stretch pin block 50, shown in FIGS. 7 and 9. The spring pressure means includes a cylindrical lift block 85 which is provided with a stepped bore therethrough, comprising the bores 86 and 87. Slidably mounted in the larger bore 86 is a head 88 of a shaft 89. Shaft 89 slidably extends down through the smaller bore 87 and has its lower end seated in a suitable bore in a carrier bar 90. The lower end of the shaft 89 is secured in place by a suitable lock nut 91. A coil spring 92 is operatively mounted between the upper face of the carrier bar 90 and the lower face of the lift block 85. It will be seen that the lift block 85 is vertically movable on the shaft 89 and that the spring 92 provides a controllable upward spring pressure or bias on the stretch pin 40. The aforedescribed spring pressure means compensates for errors and tolerances in initial assembly and alignment of the actuator means.

As shown in FIG. 9, the carrier bar 90 is fixedly mounted, as by welding, on a cam carrier bar 95. The cam carrier bar 95 is fixedly connected, as by welding, to a pair of vertically spaced apart, horizontal bars 96 and 97. Each of the horizontal bars 96 and 97 are slidably mounted on a pair of vertically disposed, laterally spaced apart, slide shafts 98. The upper ends of the slide shafts 98 are fixedly secured in a mounting plate 99. The mounting plate 99 would be fixedly secured by an suitable means to the support structure 100 on which the molding apparatus is operatively mounted. The lower ends of the slide shafts 98 are fixedly connected by any suitable means to a plate 101. As shown in FIG. 9, a cam follower roller 102 is rotatably mounted on the lower end of the cam carrier bar 95. The bars 95, 96 and 97 form a slide that carries the cam follower 102 and the aforedescribed spring pressure means for lifting a stretch pin 40.

FIG. 9 shows a spring biased latch means generally indicated by the numeral 104 which is adapted to releasably retain a stretch pin 40 in a fully elevated blow molding position, as shown in FIG. 6. FIG. 9 shows the latch means 104 in the process of being disengaged from a stretch pin cam actuator slide structure to permit downward movement of the stretch pin 40 back to its initial position of FIG. 7. The slide latch means 104 includes a striker plate 105 which is horizontally mounted on the lower side of the upper slide bar by a pair of suitable machine screws 106 and shims 107. The shims 107 permit the adjusting of the striker plate 105 upwardly or downwardly to a desired position to control the pressure of spring 92 on a stretch pin 40. As shown in FIG. 9, the underside of the striker plate 105 is adapted to be engaged by the upper end 108 of a pivotally mounted slide latch 109.

As shown in FIG. 9, the slide latch 109 is suitably mounted on a horizontal pivot pin 110 which is pivotally mounted between a pair of vertical, laterally spaced apart support plates 111. The lower ends of the support plates 111 are fixed, as by welding, to the plate 101. The upper ends of the plates 111 are fixed, as be welding, to the plate 99. The pivot pin 110 is pivotally supported in suitable bearings by a pair of journals 112 which are fixed to the inner sides of the plates 111.

As shown in FIG. 9, the slide latch 109 is normally biased clockwise to bring the upper end 108 under the striker plate 105 by means of a suitable coil spring 115 which is operatively mounted on a pair of aligned, spaced apart spring rods 116. One of the spring rods 116 is mounted in a suitable bore in the rear upper face of the slide latch 109 and the other spring rod 116 is operatively mounted in a suitable bore in a vertical retainer plate 117 which is fixedly secured between the two vertical support plates 111.

As viewed in FIG. 9, the clockwise movement of the slide latch 109 is limited by a stop member comprising a threaded rod 118 which is threadably mounted through the retainer plate 117 and secured in an adjusted position by a lock nut 119. A cam follower, in the form of a roller 120, is operatively mounted on the lower end of the slide latch 109 for camming the slide latch 109 in a counterclockwise direction, as viewed in FIG. 9, to release the slide latch 109 from under the striker plate 105.

The slide latch 109 holds the slide structure carrying the stretch finger pressure means in a raised position, as shown in FIG. 6, during a blow molding operation. As illustrated in FIG. 9, a horizontal cam 121 would be operatively mounted on the machine support structure 100 for operating the cam follower 120 at the desired timed interval during a molding operation. The cam follower 120 and its slide structure and stretch pin spring pressure means may be moved upwardly at a desired time interval by a suitable cam mounted on the support structure 100. It will be understood that any suitable stretch pin means 12 and lifting and actuating structure may be used in carrying out the principles of the invention. However, the aforedescribed stretch pin means and lifting and actuating structure of FIGS. 7, 8 and 9, is illustrated and described in detail in the aforementioned U.S. patent application entitled "Rotary Stretch Blow Molding Apparatus", in FIGS. 2-6, 8-10, 13-16, 21-24, 29 and 45-52 thereof, and the disclosure of said Figures and the written description relating thereto are incorporated herein by reference.

In practicing the method of the present invention, the stretch pin means 12 would be moved into the multi-section mold apparatus to a position in vertical alignment with the mold end plug 14, as illustrated in FIG. 2. Selectively, the mold end plug may be moved inwardly of the mold halves 13 to the position illustrated in FIG. 3. The means for moving the mold halves 13 and the neck rings 15 are then actuated to move the neck rings 15 into a clamping engagement with the threaded neck portion 11 of the parison 10, as shown in FIG. 3. If the neck rings 15 are carried by the mold halves 13, as described hereinbefore, for one type of apparatus for moving the mold parts, then the mold halves 13 will be moved from the fully open position of FIG. 2 to the partially open position of FIG. 3. It will be seen, that in the position shown in FIG. 3, the threaded end 11 of the parison 10 is securely clamped in place for a parison stretching operation, yet there is no contact between the parison 10 and the mold halves 13 whereby the parison 10 is not chilled until after it has been stretched. The parison is thus not cooled by contact with the multi-section mold apparatus except at the threaded portion 11 thereof. This last described functioning of the mold structure results in a final article having a more uniform wall thickness because of the elimination of any chilling contact of the parison 10 by the mold structure, other than at the threaded neck portion 11, during a parison stretching operation.

The stretch pin means 12 is then actuated to move the stretch pin 40 inwardly of the mold halves 13 so as to stretch the parison 10 until it engages the lower end 18 of the mold end plug 14, as shown in FIG. 3. The mold end plug 14 is then moved upwardly, as viewed in FIGS. 3 and 4, to the molding position shown in FIG. 4. Simultaneously, the stretch pin 40 is also moved upwardly to continue the stretching of the parison 10 and to maintain the upper end of the parison 10 in contact with the lower end 18 of the mold end plug 14. The simultaneous upward movement of the mold end plug 14 and stretch pin 40 continues until the mold end plug 14 reaches the molding position shown in FIG. 4. The mold halves 13 are then moved inwardly to the closed position shown in FIG. 5, and blow air is admitted to the stretch pin means 12. The blow air causes the parison 10 to be blown outwardly into the mold halve 13 so as to form the final article 67. After a predetermined time interval, the multi-section molding apparatus is moved to the open position shown in FIG. 10, the mold end plug 14 withdrawn to clear the depressed center of the mold plug, and the stretch pin apparatus 12 with the finished article 67 carried thereon is moved outwardly of the molding apparatus to a position whereby transfer air may be supplied to the stretch pin means 12 for blowing the finished article 67 off of the stretch pin 40.

It will be understood that the aforedescribed molding method could also be carried out without moving the mold end plug 14 inwardly of the mold halves 13 to the position shown in FIG. 3, but by moving it only to the molding position of FIG. 4. Alternatively, the mold end plug 14 may be held in the molding position shown in FIG. 4, and the parison 10 stretched in a one step operation into engagement with the mold end plug 14 at the molding position.

Another sequence is to move the mold end plug 14 inwardly of the mold halves 13 to a position in engagement with the parison 10, and stretch pin 40, when they are in their retracted positions, as in FIG. 2. The stretch pin 40 then extends inwardly of the mold halve 13 so as to stretch the parison 10 and raise the mold end plug 14 to the mold position of FIG. 4.

The parison 10 is held in engagement with the mold end plug 14 when the mold end plug 14 is in the molding position shown in FIGS. 4, 5 and 6 without exerting any positive pressure on the mold end plug 14. The positive spring pressure exerted by spring 92 is absorbed by contact between block 59 and bushing 62 and is transmitted through the stretch pin holder or body 39 and bushing 52, causing shoulder 53 to bear on the captured neck of the parison and establishing a seal for blowing. The aforedescribed stretch pin lifting and actuating structure permits the stretch pin actuator shown in FIG. 9 to be dropped downwardly a slight distance, as for example 1/16 inch, when the stretch pin is in the fully raised position so as to relieve any mechanical pressure on the stretch pin cam block 50, yet without losing contact between the upper end of the stretched parison and the mold end plug 14, or losing seal pressure. The control of this pressure on the stretched parison against the mold end plug 14 is provided by controlling the aforedescribed cam configurations, shims, latch adjustment and spring pressure. By appropriate adjustment of the shims 107, and the position of the lower end 62 of bushing 44, the pressure of a stretch pin 40 on a stretched parison against the mold end plug 14 may be controlled so that the contact between the stretched parison and the mold end plug 14 is merely a touch contact without any positive pressure.

While it will be apparent that the preferred embodiments of the invention herein disclosed are well calculated to fulfill the objects above stated, it will be appreciated that the invention is susceptible to modification, variation and change.

We claim:

1. In a blow molding machine having a mold assembly with a longitudinal axis and an opening with a locating shoulder therein, the combination comprising:
   stretch pin means mounted in operative relation with said mold assembly having:
   a. a tubular body;
   b. a blow air nozzle mounted in said body carrying a preform having a flangelike protrusion adjacent an open end for locating and sealing said preform against said shoulder in the mold assembly;
   c. a stretch pin slidably mounted longitudinally through said blow air nozzle between retracted and extended positions for stretching said preform;
   d. first blow air passage means operatively formed through said tubular body and blow air nozzle including an annular passage adjacent the open end of the preform for admitting blow air under pressure into the preform for blowing the preform into a finished article;

e. second air ejection passage means in the stretch pin including an outlet forward of said first blow air passage means when the stretch pin is in said extended position for ejecting the finished article from the stretch pin; and f. valve means responsive to the pressure of the blow air to prevent blow air from exiting through the second air ejection passage means during blowing of the article.

2. The apparatus of claim 1 wherein said stretch pin in retracted position has a portion extending forwardly of said nozzle substantially into the unstretched preform to aid in centering the preform on the stretch pin means prior to said stretching.

* * * * *